(12) United States Patent
Yamakawa

(10) Patent No.: US 7,765,189 B2
(45) Date of Patent: Jul. 27, 2010

(54) DATA MIGRATION APPARATUS, METHOD, AND PROGRAM FOR DATA STORED IN A DISTRIBUTED MANNER

(75) Inventor: Satoshi Yamakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 404 days.

(21) Appl. No.: 11/822,732

(22) Filed: Jul. 9, 2007

(65) Prior Publication Data

US 2008/0010325 A1    Jan. 10, 2008

(30) Foreign Application Priority Data

Jul. 10, 2006    (JP) ............................. 2006-189315

(51) Int. Cl.
G06F 17/00    (2006.01)
G06F 7/00     (2006.01)
(52) U.S. Cl. ...................................... 707/640; 707/661
(58) Field of Classification Search ....................... None
See application file for complete search history.

(56) References Cited

U.S. PATENT DOCUMENTS

2006/0010169 A1*    1/2006    Kitamura .................... 707/200

FOREIGN PATENT DOCUMENTS

JP    2005-538469    12/2005
WO    WO 2004/025404 A2    3/2004

OTHER PUBLICATIONS

Nakanishi Hideya et al, "Adaptive Data Migration Scheme with Facilitator Database Multi-Tier Distributed Storage in LHD", preprint submitted to Fusion Engineering and Design, Jun. 20, 2007, 5 pages.*
Malik Mahalingam et al, "Data Migration in a Distributed File Service", Hewlett-Packard Company 2001, 12 pages.*

* cited by examiner

*Primary Examiner*—Uyen T. Le
(74) *Attorney, Agent, or Firm*—McGinn IP Law Group, PLLC

(57) ABSTRACT

When a migration object is a stub file, a data migration apparatus, which migrates data from a source HSM execution environment to a destination HSM execution environment, reads data from source secondary storage based on a data storage address in the source secondary storage. This data storage address is stored in the stub file in source primary storage. The apparatus writes the data into destination secondary storage according to a rule for storing data and reads attribute information on the stub file stored in the source primary storage. The apparatus creates, in destination primary storage, a stub file having the same name as in the source and, according to the stub file generation format in the destination primary storage, supplies the address of the data stored in the destination secondary storage and attribute information acquired from the source primary storage to the created stub file to complete the data migration.

20 Claims, 4 Drawing Sheets

DATA MIGRATION APPARATUS, METHOD, AND PROGRAM FOR DATA STORED IN A DISTRIBUTED MANNER

RELATED APPLICATION

This application is based upon and claims the benefit of the priority of Japanese patent application No. 2006-189315, filed on Jul. 10, 2006, the disclosure of which is incorporated herein in its entirety by reference thereto.

FIELD OF THE INVENTION

The present invention relates to an information storage system, and more particularly to an apparatus, a method, and a program for migrating data from a migration source to a migration destination.

BACKGROUND OF THE INVENTION

As is apparent from the description below, the present invention is advantageously applicable to the migration of data, managed by the HSM (Hierarchical Storage Management) function in an environment in which data is hierarchically laid out on multiple storage devices by the HSM function, to another HSM execution environment. The present invention is advantageously applicable also to a device or software for migrating data, managed by the HSM function, to another storage device not included as a component of the HSM function. The following describes the background of the present invention, beginning with the outline of HSM.

When data is stored in storage devices, the storage management method, called HSM (Hierarchical Storage Management), is used with consideration for the following characteristics of storage devices.

Performance
Price
Capacity and
Data saving and additional function

This method combines multiple different storage devices hierarchically to select storage devices, where data is optimally stored according to the usage status of the user and the system, and automatically relocates data on the storage devices.

HSM is used primarily in a storage system where a relatively large mount of data, shared among multiple servers or users, is stored.

When HSM is used and thereby multiple storage devices each having different characteristics are well combined according to their purposes, it is known that the storage device cost and the storage device operation cost can be significantly reduced as compared when only one storage device is used.

An example of a typical HSM configuration that reduces the cost of storage devices is a combination in which low-cost tape storage, with low random access performance but suitable for archiving data, is used as the lower-level storage of high-cost disk storage with high random access performance.

In such a configuration, data has the following general characteristics.

"All data stored in storage is not accessed evenly but data is less frequently accessed as the time elapses after the data is created, and the data access frequency depends on how recently the data was created."

Considering this fact, the data relocation scheme (mechanism) described below is included into the storage operation system.

The scheme is described as follows.

All newly created data is once stored in disk storage and, depending upon the data access frequency, Data more likely to be accessed again is kept stored in disk storage but data less likely to be accessed is automatically relocated on tape storage.

Including such a scheme into a storage management system enables a large-capacity, low-cost storage system to be built using small-capacity disk storage and large-capacity tape storage while maintaining the service level comparable to that of a storage system composed only of disk storage.

From the characteristics of the device configuration described above, there are two types of storage devices which are called as follows:

A storage device corresponding to, and working like, disk storage is called "primary storage (1st tier storage)".

A storage device corresponding to, and working like, tape storage is called "secondary storage (2nd tier storage)". Storage devices are selected for the primary storage and the secondary storage according to the management purposes.

Typically, HSM has the following two functions:

the function to hide the relocation of data, from primary storage to secondary storage, from a machine that accesses the data and, after the data relocation, to still provide the data access environment equivalent to that before the relocation, and the function to select data to be relocated and to automatically relocate the data according to a predetermined rule.

The function to provide the data access environment equivalent to that before the relocation, which is the first function, is implemented by replacing a file, stored in the primary storage, by a file called a "stub file" when data is relocated from the primary storage to the secondary storage.

A stub file is a several-KB file containing data indicating the address in the secondary storage where the data is stored.

For example, a stub file includes the following file attribute information:

File name
File size
Access control information

This file attribute information is inherited from a file to be relocated.

A stub file is created so that file operations other than the read/write operation on the data relocated on the secondary storage can be performed by the operation on the stub file on the primary storage.

When a read/write request for data relocated on the secondary storage is issued from a data access source, the primary storage reads data from the secondary storage on behalf of the data access source and, thereby, completely hides, from the data access source, the relocation of data to the secondary storage.

Those functions are provided as an extended function specific to the file system of the primary storage (that is, the extended function provided in the file system but not accessed by a standard file system call). As long as a stub file is processed by a standard file system call specified by a file access request, the data access source can process the stub file using the function described above as if the stub file was a file equivalent to the file before the data relocation.

The function to automatically relocate data, which is the second function, is provided in:

Primary storage or
Management software integrally managing primary storage or secondary storage This relocation function relocates data by performing the following sequence of processing.

(A1) Acquire attribute information on files, stored in the primary storage, at a time scheduled in advance by the system manager.

(A2) Extract files that satisfy the relocation condition specified by the system manager in advance.

(A3) Relocate the data of the extracted files in the secondary storage.

(A4) Create stub files for data relocated in the primary storage.

This relocation function also performs the following operation for data already stored in the secondary storage.

(B1) Extract files satisfying the condition defined in advance by the system manager.

(B2) Relocate data in the primary storage again.

Note that, the relocation operation between the primary storage and the secondary storage must determine, during its execution, which type the file to be relocated is:
- a file storing data replaced by a stub file or
- an ordinary file.

However, an inquiry issued via a standard file system call cannot determine the type of a file.

Nor can a standard file system call read address information on data, stored in secondary storage, from a stub file.

To solve this problem, a special interface is provided as an extended function specific to the file system of primary storage to allow the user to:
- Acquire information used to determine whether the file is a stub file and
- Read address information from the stub file.

In addition, this interface (a special interface provided as an extended function specific to the file system of primary storage) allows the user to:
- Read and update file data without updating the time information attribute that would be changed by a usual data access request that is issued to read or update file data and
- Set attribute information that cannot be set by a standard system call.

As described above, the following two functions
- Function to provide a data access environment equivalent to that before the data relocation and
- Function to automatically relocate data use the extended function specific to the file system of primary storage to perform the following HSM operations.
- Hide the data relocation from a data access source and
- Automatically relocate data based on the relocation rule predetermined by a system manager For files such as stub files, Patent Document 1 given below discloses a method for using HSM to smoothly move the files from one file server to another and, after the files are completely moved and the source file server does not exist any more, to reduce the time required for a client to access the files. That is, Patent Document 1 discloses a method for transferring a set of files, comprising the steps of:
- receiving, by a destination file server, metadata related to the set of files and a stub file,
- updating location components in the destination file server to maintain a list of repository nodes related to each file of the set of files,
- replacing each stub file by a full content of a corresponding file related to the stub file, and
- when a client request for a specific file in the set of files is received while replacing stub files but if a full content of the specified file is not yet transferred, replacing the stub file corresponding to the specified file by the full content of the specified file, wherein a task of replacing the stub file for the specified file has priority higher than that of a task of replacing the stub file for a file not requested.

[Patent Document 1]

Japanese Patent Kohyo Publication No. JP-P2005-538469A

SUMMARY OF THE DISCLOSURE

When a storage device, used as the primary storage in the HSM execution environment where multiple storage devices are used, is so aged that it must be replaced by another storage device, the data stored in the replacement-source storage device (device to be replaced) must be migrated to the replacement-destination storage device.

To migrate data between storage devices, one of the following two means can be used.
- Means that migrates data using the interface specific to the storage device, provided for performing data replication, on a file system basis or on a file system volume basis
- Means that migrates data using an industry-standard file access protocol such as NFS (Network File System) or CIFS (Common Internet File System)

However, the data migration means, which implements data migration via standard file system calls, cannot distinguish between an ordinary file and a stub file, because the HSM operation is implemented by extended function specific to the file system.

Therefore, the data layout of the data migration source, created as an HSM-based configuration having a hierarchical relation between the primary storage and the secondary storage, cannot be reproduced in a storage device that is the data migration destination where the HSM execution environment is established. The following describes this problem using an example.

For example, when data in the HSM configuration of the data migration source is distributed between the primary storage and the secondary storage according to how recently data is stored, the following two operations are required.
- Allocate a data storage area, equal in size to the area of all data stored in the data migration source, in the primary storage of the data migration destination in advance, and
- After all data is migrated to the primary storage of the data migration destination, use the data relocation means of the primary storage of the data migration destination to evaluate which data to be relocated.

In this case, if a standard file system call is used to migrate data, there is a possibility that the time attribute, which is set by the data migration source as the index of how data is stored recently, is changed in primary storage in the data migration destination.

Once the time attribute, which is the index indicating how data is recent in the data destination source, is changed, the data layout of the data migration source cannot be reproduced correctly at the data migration destination.

In addition, the need to allocate the size of all data, stored in the primary storage and the secondary storage of the data destination source, in the primary storage of the data migration destination fails to achieve the spirit and purpose of using HSM.

The spirit and purpose of HSM used in the data migration source is to reduce the total cost of storage by combining multiple different-characteristic storage devices under the HSM management. Therefore, it is difficult to use the method described above (because the method requires that the size of all data, stored in primary storage and secondary storage of the destination source, be allocated in the primary storage of the migration destination).

Therefore, the migration of an existing HSM execution environment to an HSM execution environment, where new storage is used, requires that:

A stub file and an ordinary file be distinguished and

Data be migrated from the data migration source to the data migration destination not via an ordinary file system call.

If the following requirements are not satisfied, data cannot be migrated to another HSM execution environment while maintaining the existing data layout of the current HSM execution environment.

Accordingly, it is an object of the present invention to provide an apparatus, a system, a method, and a program that migrate data from a migration source to a migration destination while retaining the data layout structure without failing to achieve the spirit and policy of the migration source side.

It is another object of the present invention to provide an apparatus, a system, a method, and a program that eliminate the need to allocate the size of all data, stored in the primary storage and secondary storage of the data migration source, as the size of the primary storage of the data migration destination.

The present invention implements a data migration function that migrates data, while maintaining the data layout of the migration source HSM execution environment, by simply reserving the same amount of primary storage in the migration destination as the amount of primary storage in the migration source when data is migrated from an HSM execution environment to another HSM execution environment.

In accordance with the present invention, the data migration function comprises:

(a1) means for checking if the file is a stub file or an ordinary file via the extended function, specific to the file system, for implementing HSM in migration source and migration destination storage devices (a2) means, for use when the file to be migrated is a stub file, for converting the stub file, stored in the primary storage file in the migration source, to a stub file corresponding to the extended function of the file system and to the automatic data relocation function provided for the primary storage in the migration destination (a3) means for reading data, stored in the secondary storage in the migration source, from the address stored in the stub file stored in the primary storage in the migration source and for working with the stub file conversion means described above to store data directly in the secondary storage in the migration destination According to one aspect of the present invention, there is provided a method that relocates data from a migration source to a migration destination, said migration source including a data layout mode in which a predetermined file with a predefined format at least including pointer information on data and data pointed to by the pointer information in the predetermined file are stored in distributed manner in storage means in said migration source, said method comprising:

checking if a file to be migrated is the predetermined file and, if the file is the predetermined file, reading data pointed to by the pointer information in said predetermined file from the storage means in said migration source, and writing the data in associated storage means in the migration destination; and writing a predetermined file in storage means in the migration destination in a mode corresponding to said data layout mode in said migration source, in which the predetermined file and the data in the migration destination are stored in distributed manner, said predetermined file at least including pointer information pointing to the data written in the associated storage means in the migration destination, said predetermined file conforming to a predefined format in the migration destination.

A method according to the present invention migrates data from a migration source system to a migration destination system, the migration source system including first storage and second storage wherein the first storage includes an ordinary file as well as a predetermined file with a predefined format at least including pointer information on data and the second storage stores the data pointed to by the pointer information stored in the predetermined file, the migration destination system including third and fourth storage. The method comprises the steps of:

checking if a file to be migrated from the first storage in the migration source is the predetermined file;

if the file is determined as the predetermined file, reading the data, pointed to by the pointer information in the predetermined file, from the second storage in the migration source and writing the data into the third storage in the corresponding migration destination; and creating a predetermined file, conforming to a format predefined in the migration destination, in the fourth storage in the migration destination and setting the pointer information in the predetermined file in the fourth storage in the migration destination in such a way that the pointer information points to the data written in the third storage in the migration destination.

According to another aspect of the present invention, there is provided a method for use by a data migration apparatus, which migrates data from a migration source HSM (Hierarchical Storage Management) execution environment to a migration destination HSM execution environment, for migrating data from the migration source to the migration destination. The method comprises the steps of:

checking if a file to be migrated is a stub file based on a data layout in primary storage and secondary storage in the migration source;

converting the stub file to be migrated to a stub file, which conforms to the migration destination, according to a stub file format and a secondary storage data layout rule used in the migration destination HSM execution environment;

reading data of the secondary storage in the migration source from an address held in the stub file in the migration source, storing the data in the secondary storage in the migration destination and, at the same time, storing the converted stub file in primary storage in the migration destination; and migrating an ordinary file from the primary storage in the migration source to the primary storage in the migration destination.

According to the present invention, it is also possible that a method for use by a data migration apparatus, which migrates data from a migration source HSM (Hierarchical Storage Management) execution environment to a migration destination HSM execution environment, for migrating data from the migration source to the migration destination, comprises the steps of:

distinguishing between a stub file and an ordinary file via a file system specific extended function provided for implementing HSM in storages in the migration source and the migration destination;

reading data from secondary storage in the migration source based on a data storage address in secondary storage in the migration source if a file to be migrated is a stub file, the data storage address being stored in the stub file in primary storage in the migration source;

writing data, read from the secondary storage in the migration source, into secondary storage in the migration destination according to a data storage rule for storing data into the secondary storage in the migration destination;

reading attribute information on the stub file stored in the primary storage in the migration source and creating a stub file, which has the same name as the stub file in the migration source, in primary storage in the migration destination; and attaching address information on the data, stored in the secondary storage in the migration destination, and the attribute information, acquired from the primary storage in the data migration source, to the created file according to a generation format of the stub file in the migration destination to complete the migration of data of the stub file that is migrated.

According to the present invention, it is also possible that, in response to a file operation request from a data access source other than the data migration apparatus, the migrated data is corrected.

A method according to the present invention is for use by a data migration apparatus for migrating data from a migration source HSM execution environment to a migration destination HSM execution environment. The method comprises the steps of:

reading file entry information on a migration object from primary storage in the migration destination;

acquiring, from storage devices, a stub file format information and secondary storage data storing method information in the migration source and the migration destination;

if the migration object is a stub file, writing the stub file and corresponding secondary storage data in the migration source into the primary storage and secondary storage in the migration destination, respectively, according to the acquired stub file format information and secondary storage data storing method information in the migration source and the migration destination; and if the migration object is a file or a directory, creating a file or a directory, which has the same name and same attribute as those in the migration source, in the primary storage in the migration destination.

According to the present invention, it is also possible that the method further comprises the step, provided for use when a file operation request is issued from a data access source other than the data migration apparatus during the data migration, for performing a file operation on data stored in the migration destination if the data, which has the same object ID and for which the file operation is performed, is managed as data to be migrated and if the migration is already completed.

According to the present invention, it is also possible that a method for use by a data migration apparatus for migrating data from a migration source HSM execution environment to a migration destination HSM execution environment comprises the steps of:

(a) acquiring information on primary storage in a migration source and, with the use of a command set for accessing an HSM interface of the primary storage in the migration source, acquiring pathnames of files and directories included in an area, from which data is to be migrated, and object IDs associated with the files and directories from the primary storage in the migration source, and storing the acquired pathnames and object IDs as well as a migration completion flag;

(b) checking information on the primary storage and secondary storage in the migration source and primary storage and secondary storage in the migration destination to determine a migration source storage device, a migration destination storage device, and a data storage destination;

(c) accessing an object, either a file or a directory, stored in the primary storage in the migration source to check if the accessed object is a file or a directory, the file or directory being registered as a migration object with the migration completion flag thereof not turned on;

(d) if the accessed object is a directory, creating a directory, with the same name as that in the migration source, in the primary storage in the migration destination and turning on a migration completion flag in information on the directory managed as a migration object;

(e) if the accessed object is a file, checking if the accessed file is a stub file and, if the file is a stub file, reading data from the secondary storage in the migration source based on a data storage address in the secondary storage in the migration source stored in the stub file stored in the primary storage in the migration source, writing the data, read from the secondary storage in the migration source, into the secondary storage in the migration destination according to a data storage rule for writing data into the secondary storage in the migration destination, reading attribute information on the stub file stored in the primary storage in the migration source, and creating a stub file, with the same name as that of the stub file in the migration source, in the primary storage in the migration destination;

(f) supplying address information on the data stored in the secondary storage in the migration destination, as well as the attribute information acquired from the primary storage in the migration source, to the created stub file according to a stub file generation format in the primary storage in the migration destination to complete the data migration and turning on a migration completion flag in the information on the file managed as a migration object;

(g) if the file to be migrated is an ordinary file, reading data and attribute information on the file stored in the primary storage in the migration source, creating a file with the same name in the primary storage in the migration destination, supplying the attribute information, acquired from the primary storage in the migration source, to the created file to complete the data migration and turning on a migration completion flag in the information on the file managed as a migration object, and (h) terminating the migration processing if the migration completion flag is turned on for all files and directories managed as migration objects.

According to the present invention, it is also possible that the method for use when another data access source other than the data migration apparatus requests processing for a data area, from which data is to be migrated, in the primary storage in the migration source via a standard file system call further comprises the steps of:

(i) transferring information, including a processing content and an object ID of a requested object, from the primary storage in the migration source to the data migration apparatus;

(j) once storing, by the data migration apparatus, the transferred information;

(k) if the processing is update processing, acquiring a pathname from the primary storage in the migration source with the object ID as a request key;

(l) checking if there is a file or directory to be migrated, which has the same object ID as the object ID, when data migration processing being executed is terminated;

(m) if there is a file or directory with the same object ID as the object ID, checking if the migration completion flag is on;

(n) if the migration completion flag is on, setting up status to indicate that the migration is not yet completed and, if the processing content is file attribute change processing, reflecting attribute information about the requested file, which is stored and managed as a migration object, on the migration destination and, after that, turning on the migration completion flag;

(o) if the processing content is data update processing, turning off the migration completion flag of the requested file, which is stored and managed as a migration object, deleting data stored in the migration destination HSM execution environment and, after that, turning on the migration completion flag;

(p) if the processing content is deletion processing, deleting the data of a requested file or directory, which is stored in the migration destination HSM execution environment and, after that, deleting information on the requested file or directory stored and managed as a migration object;

(q) if the processing content is file or directory movement processing, moving a file or directory, stored in the migration destination HSM execution environment, to a location in the same pathname as a movement destination pathname specified in the movement processing and, after that, turning on the migration completion flag; and (r) if the migration completion flag is not on and if the processing content is file or directory movement processing, changing a pathname in the information on the requested directory or file stored and managed as a migration object and, if the processing content is deletion processing, deleting information on the requested file or directory stored and managed as a migration object and, if the processing content is file attribute change processing or data update processing, performing no processing.

According to the present invention, it is also possible that the method further comprises the step of registering, as a migration object, the pathname and the object ID included in the transferred information, as well as a flag indicating that the migration is not yet completed, if the checking in step (l) indicates that there is no file or directory which has an object ID matching the object ID.

According to one aspect of the present invention, there is provided a device that relocates data from a migration source to a migration destination, said migration source including a data layout mode in which a predetermined file with a predefined format at least including pointer information on data and data pointed to by the pointer information in the predetermined file are stored in distributed manner in storage means in said migration source, said data migration apparatus comprising:

means that checks if a file to be migrated is the predetermined file and, if the file is the predetermined file, reads data pointed to by the pointer information in said predetermined file from the storage means in said migration source, and writes the data in associated storage means in the migration destination; and means that writes a predetermined file in storage means in the migration destination in a mode corresponding to said data layout mode in said migration source, in which the predetermined file and the data in the migration destination are stored in distributed manner, said predetermined file at least including pointer information pointing to the data written in the associated storage means in the migration destination, said predetermined file conforming to a predefined format in the migration destination.

A device according to the present invention migrates data from a migration source system to a migration destination system, the migration source system including first storage and second storage wherein the first storage includes an ordinary file as well as a predetermined file with a predefined format at least including pointer information on data and the second storage stores the data pointed to by the pointer information stored in the predetermined file, the migration destination system including third and fourth storage. The device comprises means that checks if a file to be migrated from the first storage in the migration source is the predetermined file; means that, if the file is determined as the predetermined file, reads the data, pointed to by the pointer information in the predetermined file, from the second storage in the migration source and writes the data into the third storage in the corresponding migration destination; and means that creates a predetermined file, conforming to a format predefined in the migration destination, in the fourth storage in the migration destination and sets the pointer information in the predetermined file in the fourth storage in the migration destination in such a way that the pointer information points to the data written in the third storage in the migration destination.

According to another aspect of the present invention, there is provided a device that migrates data from a migration source HSM (Hierarchical Storage Management) execution environment to a migration destination HSM execution environment. The device comprises:

means that checks if a file to be migrated is a stub file based on a data layout in primary storage and secondary storage in the migration source;

means that converts the stub file to be migrated to a stub file, which conforms to the migration destination, according to a stub file format and a secondary storage data layout rule used in the migration destination HSM execution environment;

means that reads data of the secondary storage in the migration source from an address held in the stub file in the migration source, stores the data in the secondary storage in the migration destination and, at the same time, stores the converted stub file in primary storage in the migration destination; and means that migrates an ordinary file other than the stub file from the primary storage in the migration source to the primary storage in the migration destination.

According to another aspect of the present invention, there is provided a device that migrates data from a migration source HSM (Hierarchical Storage Management) execution environment to a migration destination HSM execution environment. The device comprises:

means that distinguishes between a stub file and an ordinary file via a file system specific extended function provided for implementing HSM in storages in the migration source and the migration destination;

means that reads data from secondary storage in the migration source based on a data storage address in secondary storage in the migration source if a file to be migrated is a stub file, the data storage address being stored in the stub file in primary storage in the migration source;

means that writes data, read from the secondary storage in the migration source, into secondary storage in the migration destination according to a data storage rule for storing data into the secondary storage in the migration destination;

means that reads attribute information on the stub file stored in the primary storage in the migration source and creates a stub file, which has the same name as the stub file in the migration source, in primary storage in the migration destination; and means that attaches address information on the data, stored in the secondary storage in the migration destination, and the attribute information, acquired from the primary storage in the data migration source, to the created file according to a generation format of the stub file in the migration destination to complete the migration of data of the stub file that is migrated.

The device according to the present invention may further comprise means, provided for use when a file operation request is issued from a data access source other than the data migration apparatus to the primary storage in the migration source during the data migration, for performing a file operation on the data stored in the migration destination if the data, which has the same object ID and for which the file operation is performed, is managed as data to be migrated and if the migration is already completed.

A device according to the present invention comprises a management interface, a data migration processing control unit, an HSM processing information management unit, a migration processing information management unit, a migration file management unit, and a file system event management unit.

The management interface has a function to notify pre-set information, which is necessary for data migration, to the migration processing information management unit and to acquire information on execution status of the data migration processing from the data migration processing control unit and a function to notify a migration processing start instruction to the data migration processing control unit.

The HSM processing information management unit stores a command set for performing file system specific extended function processing via the HSM interface in the HSM execution environment, a generation format of a stub file, and a data relocation rule, used by each of the policy management devices, for relocating data in the secondary storage.

The migration processing information management unit stores information on the storages used in the migration, information on a data area, from which data is to be migrated, in the primary storage in the migration source, information on a data storage area in the storage in the migration destination, and device information on the policy management devices, all the information being set via a management interface.

The migration file management unit stores pathnames of all files and directories included in the data area, from which data is to be migrated, that are set via the management interface, object IDs that identify the files and the directories in the file system, and flag information indicating whether or not the data migration of the files and directories is completed.

The file system event management unit has a function to acquire, via the HSM interface, processing event information generated when processing is performed by a general data access source via a specific standard file system call and to transfer the processing event information to the data migration processing control unit.

The data migration processing control unit may have a function to migrate data from the migration source HSM execution environment to the migration destination HSM execution environment based on the information stored in the HSM processing information management unit, the migration processing information management unit, and the migration file management unit and on the event information notified from the file system event management unit and a function to generate information on execution status of the data migration processing.

According to another aspect of the present invention, there is provided a data migration system comprising a migration source HSM execution environment that comprises data migration source primary storage, data migration source secondary storage, and a data migration source policy management device that controls relocation of data in those storages based on a predefined rule;

a data migration destination HSM execution environment that comprises data migration destination primary storage, data migration destination secondary storage, and a data migration destination policy management device that controls relocation of data in those storages based on a predefined rule; and a data migration apparatus that migrates data from the migration source HSM execution environment to the migration destination HSM execution environment, wherein the data migration source primary storage and the data migration destination primary storage each comprise a file system and an HSM interface and data stored in the file system is accessed externally via the HSM interface, and the data migration apparatus comprises a management interface, a data migration processing control unit, an HSM processing information management unit, a migration processing information management unit, a migration file management unit, and a file system event management unit.

The management interface has a function to notify pre-set information, which is necessary for data migration, to the migration processing information management unit and to acquire information on execution status of the data migration processing from the data migration processing control unit and a function to notify a migration processing start instruction to the data migration processing control unit.

The HSM processing information management unit stores a command set for performing file system specific extended function processing via the HSM interface in the HSM execution environment, a generation format of a stub file, and a data relocation rule, used by each of the policy management devices, for relocating data in the secondary storage.

The migration processing information management unit stores information on the storages used in the migration, information on a data area, from which data is to be migrated, in the primary storage in the migration source, information on a data storage area in the storage in the migration destination, and device information on the policy management devices, all the information being set via a management interface.

The migration file management unit stores pathnames of all files and directories included in the data area, from which data is to be migrated, that are set via the management interface, object IDs that identify the files and the directories in the file system, and flag information indicating whether or not the data migration of the files and directories is completed.

The file system event management unit has a function to acquire, via the HSM interface, processing event information generated when processing is performed by a general data access source via a specific standard file system call and to transfer the processing event information to the data migration processing control unit, and the data migration processing control unit has a function to migrate data from the migration source HSM execution environment to the migration destination HSM execution environment based on the information stored in the HSM processing information management unit, the migration processing information management unit, and the migration file management unit and on the event information notified from the file system event management unit and a function to generate information on execution status of the data migration processing.

According to the present invention, the file system comprises means that hides a data storage position from a data access source by means of a stub file provided for implementing HSM. According to the present invention, an extended file system function that is not supported by a standard file system call and that is executed via the HSM interface includes a function to create, read, update, and delete the stub file and a function to read and update attribute information on the stub file. It is also possible that the file system further comprises, as the extended function executed via the HSM interface, at least one of a function to read and update a file; a function to create, read, update, and delete file data without changing file attribute information; and a function to notify that a processing event occurs when processing is performed by a data access source via a specific standard file system call.

According to the present invention, it is also possible that, as the processing event, a processing content and an object ID are notified, the object ID being identification information used in the file system to identify a file or directory for which the processing is performed.

According to the present invention, it is also possible that the data migration processing control unit receives a data migration processing notification from the management interface when data is migrated, the data migration processing control unit acquires information on the primary storage in the migration source from the migration processing information management unit, the data migration processing control unit uses the command set, registered in the HSM processing information management unit for accessing the HSM interface of the primary storage in the migration source, to acquire the pathnames of files and directories included in an area, from which data is to be migrated, and the object IDs associated with the files and directories from the primary storage in the migration source and stores the acquired pathnames and object IDs into the migration file management unit, the data migration processing control unit checks information on the primary storage and secondary storage in the migration source and the primary storage and secondary storage in the migration destination, stored in the migration processing information management unit, to determine a migration source storage device, a migration destination storage device, and a data storage destination, the data migration processing control unit accesses an object, either a file or a directory, stored in the primary storage in the migration source to check if the accessed object is a file or a directory, the file or directory being registered in the migration file management unit with the migration completion flag thereof not turned on, and if the accessed object is a directory, the data migration processing control unit creates a directory, with the same name as that of a directory in the migration source, in the primary storage in the migration destination and turns on a migration completion flag in information on the directory managed as a directory to be migrated, and if the accessed object is a file, the data migration processing control unit checks if the accessed file is a stub file and, if the file is a stub file, reads data from the secondary storage in the migration source based on a data storage address in the secondary storage stored in the stub file stored in the primary storage in the migration source, writes the data, read from the secondary storage in the migration source, into the secondary storage in the migration destination according to a data storage rule for writing data into the secondary storage in the migration destination, reads attribute information on the stub file stored in the primary storage in the migration source, and creates a stub file, with the same name as that of the stub file in the migration source, in the primary storage in the migration destination, the data migration processing control unit supplies address information on the data stored in the secondary storage in the migration destination, as well as the attribute information acquired from the primary storage in the migration source, to the created stub file according to a stub file generation format in the primary storage in the migration destination to complete the data migration, and turns on a migration completion flag in the information on the file registered in the migration file management unit, if the file to be migrated is an ordinary file, the data migration processing control unit reads data and attribute information on the file stored in the primary storage in the migration source, creates a file, with the same name as that of the file in the primary storage in the migration source, in the primary storage in the migration destination, supplies the attribute information, acquired from the primary storage in the migration source, to the created file to complete the data migration, and turns on a migration completion flag in the information on the file registered in the migration file management unit, and the migration processing is terminated if the migration completion flag is turned on for all files and directories registered in the migration file management unit.

According to the present invention, it is also possible that, if another data access source other than the data migration apparatus requests processing for a data area, from which data is to be migrated, in the primary storage in the migration source via a standard file system call, information, including a processing content and an object ID of a requested object, is transferred from the primary storage in the migration source to the data migration apparatus, the data migration apparatus once stores the transferred information into the file system event management unit, the file system event management unit acquires a pathname from the primary storage in the migration source with the object ID as a request key if the processing is update processing, the data migration processing control unit checks if there is a file or directory to be migrated, which has the same object ID as the object ID, when data migration processing being executed is terminated and, if there is a file or directory with the same object ID as the object ID, checks if the migration completion flag is on, and if the migration completion flag in the migration file management unit is on, the data migration processing control unit sets up status to indicate that the migration is not yet completed and, if the processing content is file attribute change processing, the data migration processing control unit reflects attribute information about the requested file, which is stored and managed as a file to be migrated, on the migration destination and, after that, turns on the migration completion flag, if the processing content is data update processing, the data migration processing control unit turns off the migration completion flag of the requested file, which is registered in the migration file management unit, deletes data stored in the migration destination HSM execution environment and, after that, turns on the migration completion flag, if the processing content is deletion processing, the data migration processing control unit deletes the data of a requested file or directory, which is stored in the migration destination HSM execution environment and, after that, deletes information on the requested file or directory which is stored in the migration file management unit, if the processing content is file or directory movement processing, the data migration processing control unit moves a file or directory, stored in the migration destination HSM execution environment, to a location in the same pathname as a movement destination pathname specified in the movement processing and, after that, turns on the migration completion flag, and on the other hand, if the migration completion flag is not on and if the processing content is file or directory movement processing, the data migration processing control unit changes a pathname in the information on the requested directory or file which is registered in the migration file management unit, if the processing content is deletion processing, the data migration processing control unit deletes information on the requested file or directory which is registered in the migration file management unit, and if the processing content is file attribute change processing or data update processing, the data migration processing control unit performs no processing.

According to the present invention, if there is no information, which has an object ID matching the object ID, in the information stored in the migration file management unit, it is also possible that the data migration processing control unit registers the pathname and the object ID, included in the information transferred from the file system event management unit, as well as a flag indicating that the migration is not yet completed, in the migration file management unit.

According to one aspect of the present invention, there is provided a computer program executed in a computer constituting a device that relocates data from a migration source to a migration destination, said migration source including a data layout mode in which a predetermined file with a predefined format at least including pointer information on data and data pointed to by the pointer information in the predetermined file are stored in distributed manner in storage means in said migration source, said program causing said computer to execute the processing of:

checking if a file to be migrated is the predetermined file and, if the file is the predetermined file, reading data pointed to by the pointer information in said predetermined file from the storage means in said migration source, and writing the data in associated storage means in the migration destination; and writing a predetermined file in storage means in the migration destination in a mode corresponding to said data layout mode in said migration source, in which the predetermined file and the data in the migration destination are stored in distributed manner, said predetermined file at least including pointer information pointing to the data written in the associated storage means in the migration destination, said predetermined file conforming to a predefined format in the migration destination.

A computer program according to the present invention is executed in a computer constituting a device that migrates data from a migration source system to a migration destination system, the migration source system including first storage and second storage wherein the first storage includes an ordinary file as well as a predetermined file with a predefined format at least including pointer information on data and the second storage stores the data pointed to by the pointer information stored in the predetermined file. The computer program causes the computer to:

check if a file to be migrated from the first storage in the migration source is the predetermined file;

if the file is determined as the predetermined file, read the data, pointed to by the pointer information in the predetermined file, from the second storage in the migration source and write the data into the second storage in the corresponding migration destination; and create a predetermined file, which has the same name as that in the first storage in the migration source and which conforms to a format predefined in the migration destination, in the first storage in the migration destination and set the pointer information in the predetermined file in the first storage in the migration destination in such a way that the pointer information points to the data written in the second storage in the migration destination.

According to one aspect of the present invention, there is provided a computer program executed in a computer constituting a data migration apparatus, which migrates data from a migration source HSM (Hierarchical Storage Management) execution environment to a migration destination HSM execution environment, for migrating data from the migration source to the migration destination. The computer program causes the computer to:

check if a file to be migrated is a stub file based on a data layout in primary storage and secondary storage in the migration source;

convert the stub file to be migrated to a stub file, which conforms to the migration destination, according to a stub file format and a secondary storage data layout rule used in the migration destination HSM execution environment;

read data of the secondary storage in the migration source from an address held in the stub file in the migration source, store the data in the secondary storage in the migration destination and, at the same time, store the converted stub file in primary storage in the migration destination; and migrate an ordinary file other than the stub file from the primary storage in the migration source to the primary storage in the migration destination.

According to another aspect of the present invention, there is provided a computer program executed in a computer constituting a data migration apparatus, which migrates data from a migration source HSM (Hierarchical Storage Management) execution environment to a migration destination HSM execution environment, for migrating data from the migration source to the migration destination. The computer program causes the computer to:

distinguish between a stub file and an ordinary file via a file system specific extended function provided for implementing HSM in storages in the migration source and the migration destination;

read data from secondary storage in the migration source based on a data storage address in secondary storage in the migration source if a file to be migrated is a stub file, the data storage address being stored in the stub file in primary storage in the migration source;

write data, read from the secondary storage in the migration source, into secondary storage in the migration destination according to a data storage rule for storing data into the secondary storage in the migration destination;

read attribute information on the stub file stored in the primary storage in the migration source and create a stub file, which has the same name as the stub file in the migration source, in primary storage in the migration destination; and attach address information on the data, stored in the secondary storage in the migration destination, and the attribute information, acquired from the primary storage in the migration source, to the created file according to a generation format of the stub file in the migration destination to complete the migration of data of the stub file that is migrated.

The computer program according to the present invention may further cause the computer to perform a file operation for data stored in the migration destination if a file operation request is generated from another data access source other than the data migration apparatus to the primary storage in the migration source during data migration and if data which has the same object ID and for which the file operation is to be performed is managed as a data migration object and is already migrated.

The meritorious effects of the present invention are summarized as follows.

The present invention allows data to be migrated from the migration source to the migration destination while retaining the data layout mode but without any inconsistency with the data layout policy in the migration destination.

When data is transferred between the migration source and the migration destination storage devices, the data migration apparatus according to the present invention allows data to be moved to the migration destination HSM execution environment while maintaining the data layout in the migration source HSM execution environment by simply reserving the same storage size as that reserved in the migration source primary storage in the migration destination primary storage even if there is only an interface via the standard file system call, such as NFS or CIFS, as the data access common interface. That is, the data migration apparatus according to the present invention eliminates the need for consuming extra storage for the data migration.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

EXAMPLES OF THE INVENTION

The present invention described above will be described more in detail with reference to the attached drawings. The present invention provides a data migration apparatus, method, and program that relocate data from a migration source system to a migration destination system while maintaining a data layout mode, the data layout mode being used in the migration source for distributing file data between storage means for storing a predetermined file (for example, a stub file) in a predefined format at least including pointer information (address information) on data and storage means for storing data pointed to by the pointer information stored in the predetermined file. The data migration apparatus (method, program) according to the present invention checks if a file to be migrated is the predetermined file (for example, a stub file) and, if the file is the predetermined file, reads the data pointed to by the pointer information in the predetermined file from the storage means in the migration source and writes the data in corresponding storage means in the migration destination; and creates and writes a predetermined file in storage means in the migration destination in a mode in which the predetermined file and the data written in the migration destination are stored in distributed manner, the predetermined file at least including pointer information pointing to the data written in the corresponding storage means in the migration destination, the predetermined file conforming to a predefined format in the migration destination.

A data migration apparatus (method, program) according to the present invention migrates data from a migration source system to a migration destination system, the migration source system including first storage and second storage wherein the first storage includes an ordinary file as well as the predetermined file and the second storage stores the data pointed to by the pointer information stored in the predetermined file. In doing so, the data migration apparatus checks if a file to be migrated from the first storage in the migration source is the predetermined file; and if the file is determined as the predetermined file, reads the data, pointed to by the pointer information in the predetermined file, from the second storage in the migration source and writes the data into the second storage in the corresponding migration destination; and creates a predetermined file in the first storage in the migration destination and sets the pointer information in the predetermined file in such a way that the pointer information points to the data written in the second storage in the migration destination. The following describes an example in which the present invention is applied to a data migration apparatus that migrates data from a migration source HSM execution environment to a migration destination HSM execution environment.

Figure 1:
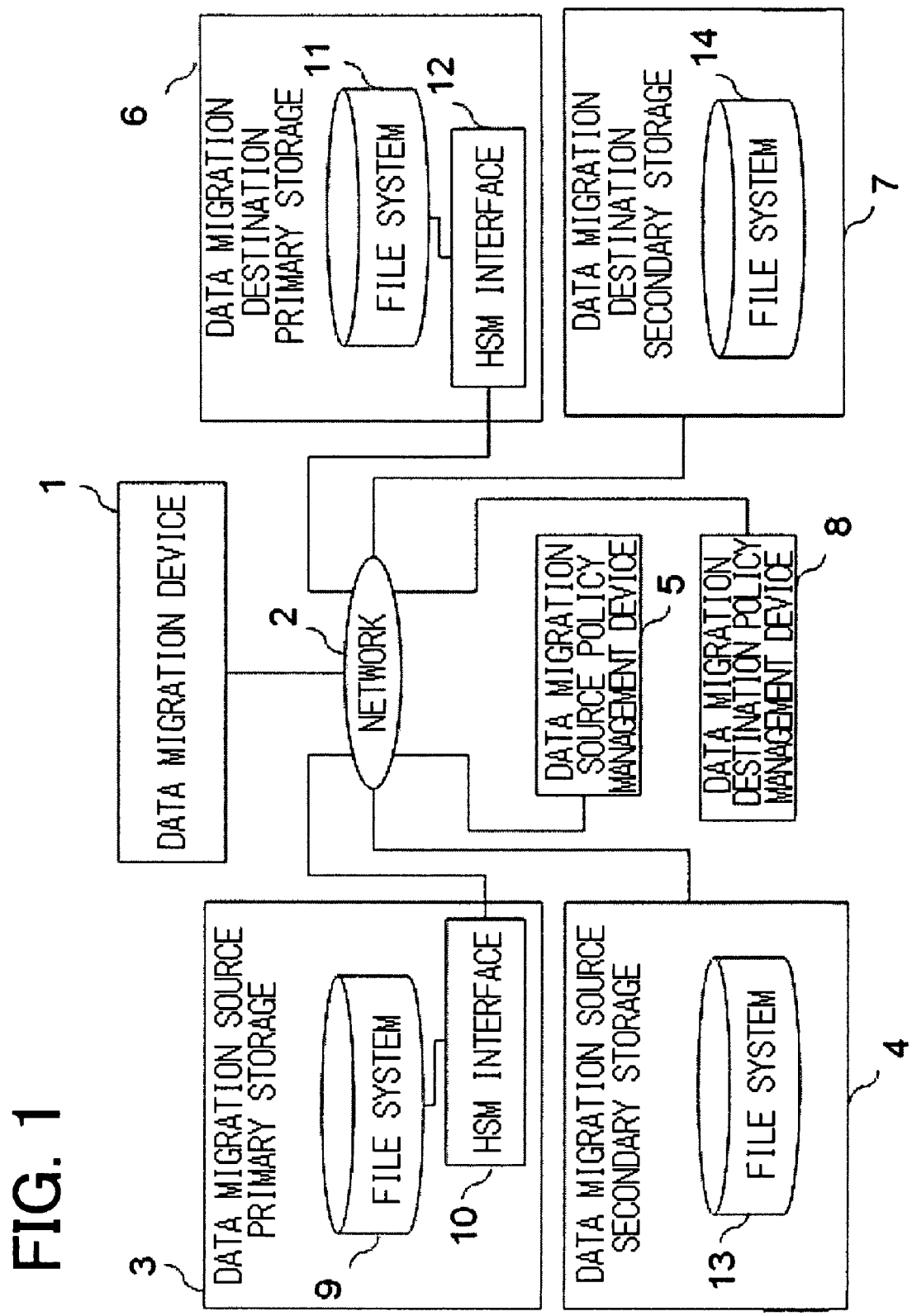
FIG. 1 is a diagram showing the configuration of a system in one example of the present invention.

FIG. 1 shows an example of the system configuration where data is migrated in one example of the present invention.

Referring to FIG. 1, the system in this example comprises the following.

- a data migration source HSM execution environment comprising data migration source primary storage 3, data migration source secondary storage 4, and a data migration source policy management device 5 that controls the data relocation of the storages 3 and 4 based on a predetermined rule,
- a data migration destination HSM execution environment comprising data migration destination primary storage 6, data migration destination secondary storage 7, and a data migration destination policy management device 8 that controls the data relocation of the storages 6 and 7 based on a predetermined rule and
- a data migration apparatus 1 that migrates data from the migration source HSM execution environment to the migration destination HSM execution environment.

They are interconnected via a network 2 so that they can communicate with each other.

The data migration source primary storage 3 has a file system 9 and an HSM interface 10, and the data migration destination primary storage 6 has a file system 11 and an HSM interface 12. Data stored in the file systems 9 and 11 can be accessed externally via HSM interfaces 10 and 12, respectively.

The file systems 9 and 11 have data storage location hiding means (not shown) that uses a stub file to hide a data storage location from a data access source to implement HSM. In addition, the file systems 9 and 11 allow a data access source to use the extended function, specific to the file systems, via the HSM interfaces 10 and 12. The extended function specific to the file system includes functions not supported and not processable by a standard file system call.

The extended functions specific to the file system but not processable by a standard file system call include the following.

Function to create, read, update, and delete a stub file
Function to read and update the attribute information on a stub file
Function to read and update file data
Function to create, read, update, and delete file data without changing the attribute information on a file
Function to notify the occurrence of a processing event generated when processing is performed via a specific standard file system call issued from a general data access source The processing event described above includes the following.

Processing content (update, delete, etc.)
Object ID indicating a file or a directory where the processing is executed. This ID is identification information used in the file system 9 or file system 11.

The secondary storage 4 has a file system 13, and the secondary storage 7 has a file system 14. Data stored in the file systems 13 and 14 can be accessed via the network 2.

Figure 2:
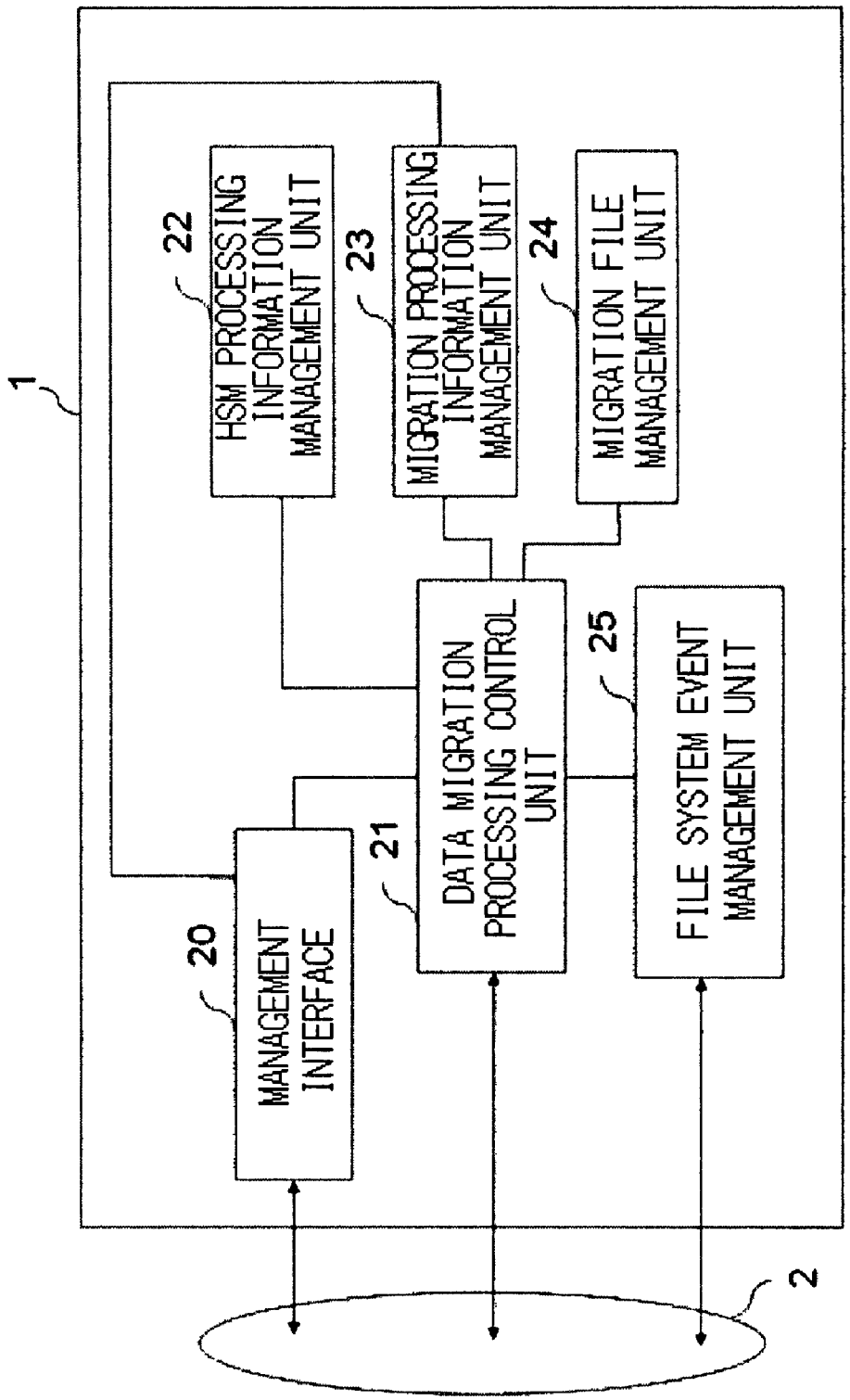
FIG. 2 is a diagram showing the configuration of a data migration apparatus in one example of the present invention.

FIG. 2 shows an example of the configuration of the data migration apparatus 1. Referring to FIG. 2, the data migration apparatus 1 comprises a management interface 20, a data migration processing control unit 21, an HSM processing information management unit 22, a migration processing information management unit 23, a migration file management unit 24, and a file system event management unit 25.

The management interface 20 has the functions to:
Allow the system manager to notify pre-set information, necessary for data migration, to the migration processing information management unit 23 and to acquire information on the status of the data migration processing from the data migration processing control unit 21 and
Notify the migration processing start instruction to the data migration processing control unit 21

The HSM processing information management unit 22 stores the following.
Command set for executing the various types of processing of the extended function specific to the file system in the HSM execution environment via the HSM interfaces 10 and 12
Stub file generation format
Rule used by policy management devices 5 and 8 to relocate data on secondary storage The migration processing information management unit 23 stores the following information that is set by the system manager via the management interface 20.
Device type information (device information) on storage 3, 4, 6, and 7 to or from which data is migrated and address information
Information on data area in migration source primary storage 3 from which data is to be migrated
Information on data storage area in destination storage 6 and 7
Device information on policy management devices 5 and 8

The migration file management unit 24 stores the following.
Pathnames of all files and directories included in the area of data to be migrated, specified via the management interface 20
Object IDs identifying the files and directories in the file system
Flag information indicating whether or not data migration of the files and directories is completed This flag information is notified to the migration file management unit 24 as the execution status of data migration processing via the data migration processing control unit 21 and the management interface 20.

The file system event management unit 25 has the function to:
Acquire, via the HSM interfaces 10 and 12, processing event information generated when a standard access source performs processing via a particular standard file system call and
Transfer the processing event information to the data migration processing control unit 21.

The data migration processing control unit 21 moves data from the migration source HSM execution environment to the migration destination HSM execution environment based on:
Information stored in the HSM processing information management unit 22, migration processing information management unit 23, and migration file management unit 24 and
Event information notified from the file system event management unit 25.

The data migration processing control unit 21 also has the function to generate information on the execution status of data migration processing.

<Data Migration Procedure>

Figure 3:
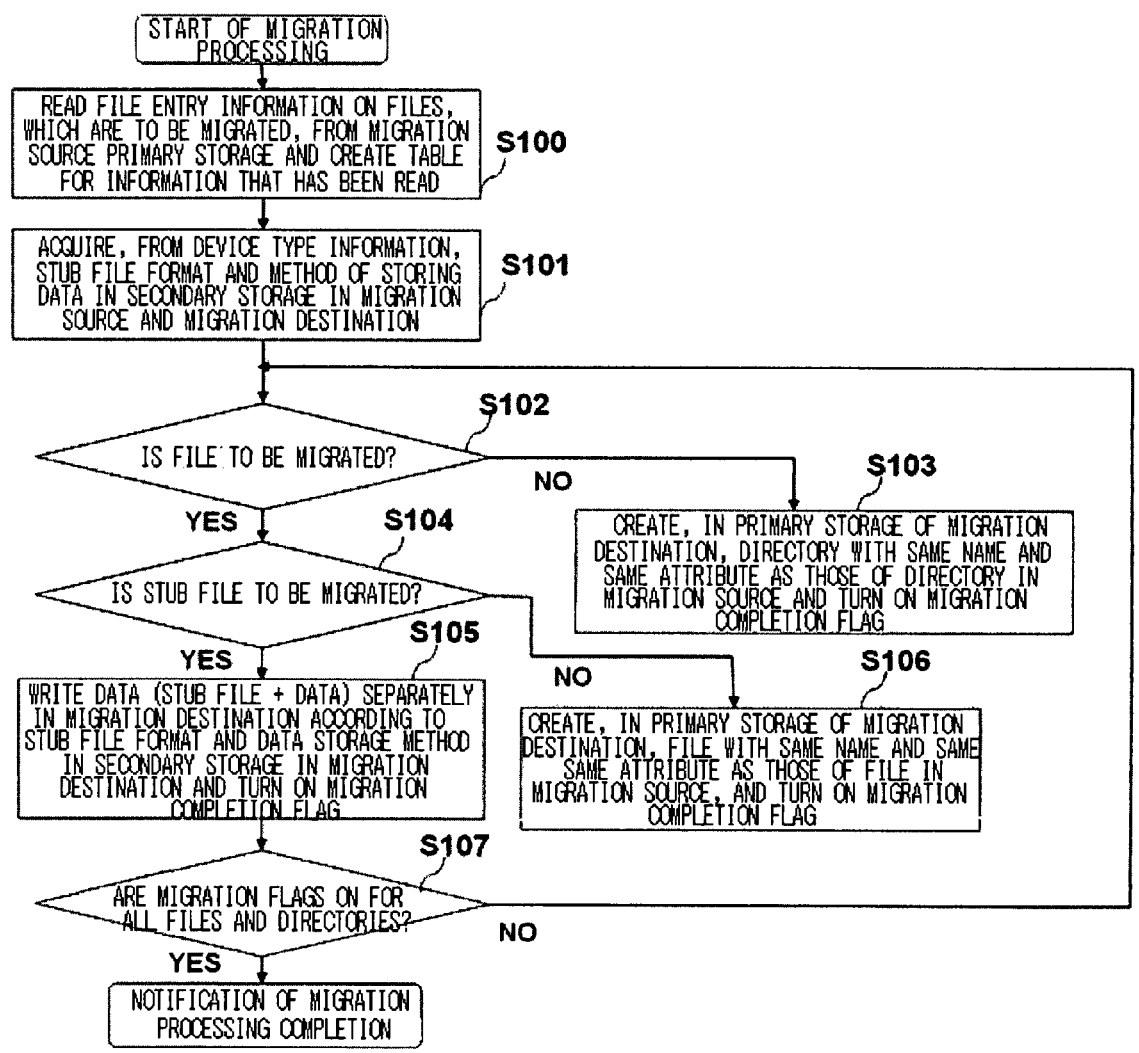
FIG. 3 is a flowchart showing a procedure for data migration processing in one example of the present invention.

Next, the following describes the procedure for migrating data from the data migration source HSM execution environment to the data migration destination HSM execution environment via the data migration apparatus 1 with reference to FIG. 1, FIG. 2, and FIG. 3. FIG. 3 is a flowchart showing the procedure for data migration processing in one example of the present invention.

First, before the data migration processing is started, the automatic data relocation function of the data migration source policy management devices 5 and 8 is stopped to prevent the policy management devices 5 or 8 from relocating data while the data migration apparatus 1 performs the data migration.

In response to a start notification of data migration processing from the management interface 20, the data migration processing control unit 21 acquires the following information on the data migration source primary storage 3 from the migration processing information management unit 23.
Device type information
Address information and
Information on data migration areas in primary storage After that, the data migration processing control unit 21 reads the command set registered in the HSM processing information management unit 22 for executing the extended function specific to the file system 9 via the HSM interface 10 of the storage 3. The data migration processing control unit 21 uses the command set to acquire the following included in the data migration area.
Pathnames of all files and directories
Object IDs associated with the files and the directories The data migration processing control unit 21 acquires them from the data migration source primary storage 3 and stores the acquired information in the migration file management unit 24 (step S100). Although the present invention is not limited thereto, the information to be stored in the migration file management unit 24 may be stored in a table format for high-speed data extraction.

After acquiring information on all files and directories, the data migration processing control unit 21 acquires the following information from the migration processing information management unit 23.

- Address information and device type information on storage 4, 6, and 7
- Device type information on the data migration source policy management device 5 and data migration destination policy management device 8 and
- Information on the data storage areas in the migration destination storage 6 and 7

The data migration processing control unit 21 uses the information acquired in step S100, which includes

- Address information on data migration source primary storage 3
- Address information on storage 4, 6, and 7 and
- Information on data storage areas on storage 6 and 7, to determine the following.
- Migration source storage device and
- Migration destination storage device and data storage location The data migration processing control unit 21 uses

- Device type information on the primary storage 3 and 6 and
- Device type information on the policy management devices 5 and 8 to acquire

- Command set for executing the extended function specific to the file system 11 via the HSM interface 12 of the data migration destination primary storage 6
- Generation format of stub files in the primary storage 3 and 6 and
- Rule to store data in the secondary storage 4 and 7 that are stored in the HSM processing information management unit 22 (step S101).

The data migration processing control unit 21 checks the files and directories, which are registered in the migration file management unit 24 and whose migration completion flag is not on, in such a way that, beginning with the highest-level directory in the directory tree, the data migration processing control unit 21 sequentially accesses the files and directories stored in the data migration source primary storage 3 and checks if the accessed entry is a directory or a file (step S102).

If it is found as a result of step S102 that the accessed entry is a directory (NO in step S102), the data migration processing control unit 21 reads the attribute information of the directory and creates a directory in the migration destination primary storage 6, with the same name as that in the migration source attached, in step S103. In addition, the data migration processing control unit 21 moves the attribute information, acquired from the data migration source primary storage 3, to the created directory to complete the data migration and turns on the migration completion flag in the directory information stored in the migration file management unit 24.

If it is found as a result of checking in step S102 that the accessed entry is a file, the data migration processing control unit 21 checks if the file is a stub file (step S104).

If it is found as a result of checking in step S104 that the file is a stub file (YES in step S104), the data migration processing control unit 21 performs the following in step S105. That is, the data migration processing control unit 21 reads the data storage address in the secondary storage, which is stored in the stub file stored in the data migration source primary storage 3, reads data from the data migration source secondary storage 4 with the storage address as the read address, and writes data, read from the data migration source secondary storage 4, to the data migration destination secondary storage 7 according to the data storage rule for storing data in the data migration destination secondary storage 7 acquired in step S101. At the same time, the data migration processing control unit 21 reads the attribute information of the stub file stored in the data migration source primary storage 3 and creates a stub file in the data migration destination primary storage 6 with the same file name as that of the stub file assigned.

In addition, the data migration processing control unit 21 adds the following information to the stub file created according to the generation format of a stub file in the migration destination primary storage 6 acquired in step S101.

- Address information on the data stored in the data migration destination secondary storage 7 and
- The attribute information acquired from the data migration source primary storage 3

By doing so, the data migration processing control unit 21 completes the data migration and turns on the migration completion flag in the file information stored in the migration file management unit 24. The data migration processing control unit 21 performs the above-described processing in step S105.

If it is found as a result of step S104 that the file is not a stub file (NO in step S104), that is, if the migration entry is an ordinary file, the data migration processing control unit 21 reads

- File (ordinary file) data and
- Attribute information stored in the data migration source primary storage 3 in step S106 and creates a file in the data migration destination primary storage 6 with the same name as that of the file (ordinary file) assigned.

In addition, the data migration processing control unit 21 moves the attribute information, acquired from the data migration source primary storage 3, to the created file to complete the data migration and turns on the migration completion flag in the file information stored in the migration file management unit 24. The data migration processing control unit 21 performs the above-described processing in step S106.

The data migration processing control unit 21 checks

- All files and
- All directories stored in the migration file management unit 24 to determine if the migration completion flag is on (step S107).

If there is a file whose migration completion flag is not on or there is a directory whose migration completion flag is not on (unprocessed file or directory) (NO in step S107), the data migration processing control unit 21 repeats the processing beginning at step S102.

On the other hand, if the migration completion flags are on in all file or directory information (YES in step S107), the data migration processing control unit 21 sends a migration processing completion notification to the management interface 20.

<Processing for a File Access Via Standard File System Call During Migration>

Figure 4:
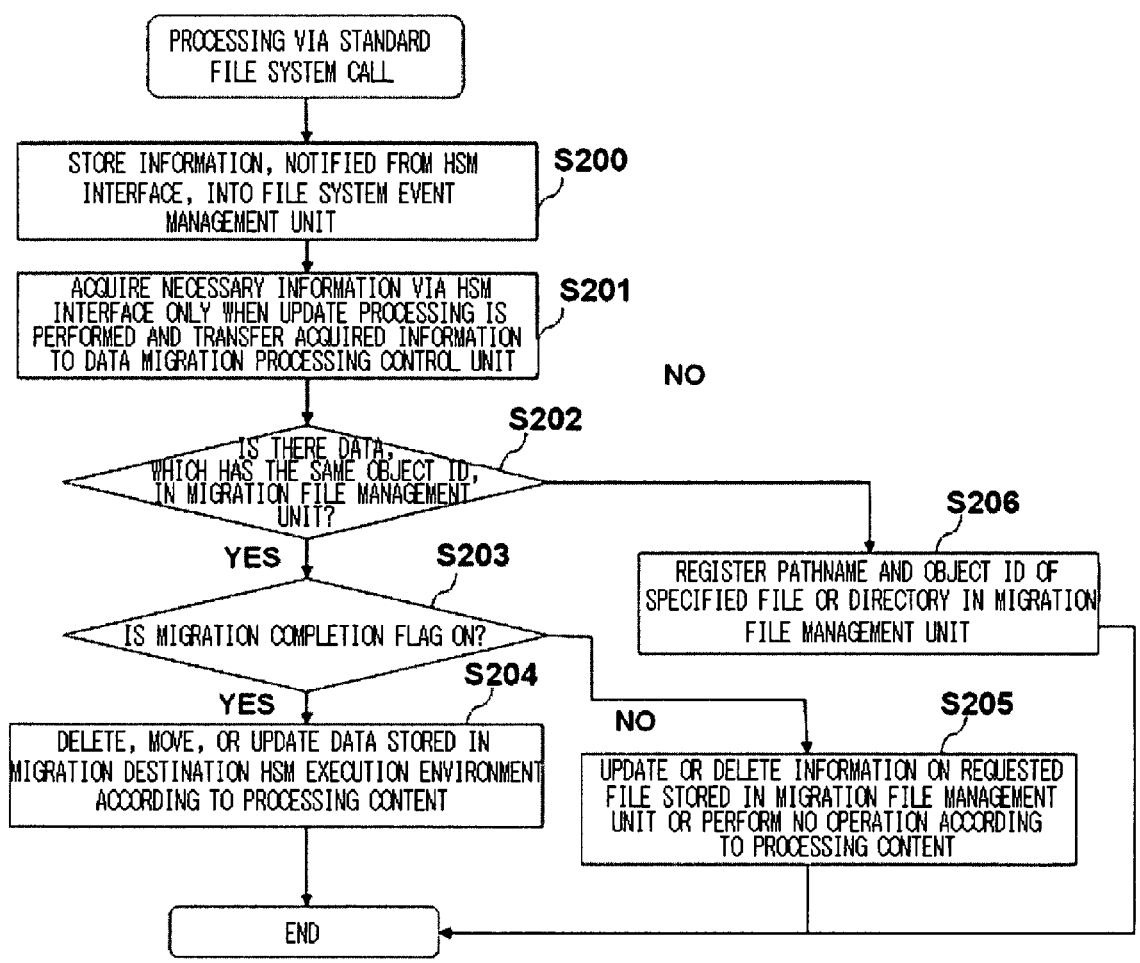
FIG. 4 is a flowchart showing a processing procedure executed in one example of the present invention when a data access via a standard file system call is made from a data access source other than the data migration apparatus during data migration processing.

Next, with reference to the flowchart in FIG. 4, the following describes how the data migration apparatus 1 processes a file or directory processing request such as Creation
Deletion
Attribute change or
Data update that is issued, via a standard file system call, from another data access source to a data area from which data is being migrated while the data migration apparatus 1 is performing migration for that data area. FIG. 4 is a flowchart showing the procedure used in one example of the present invention for processing a data access request issued via a standard file system call from a data access source, other than the data migration apparatus, during data migration processing.

When processing is performed via a standard file system call issued from a data access source other than the data migration apparatus 1 to a data area in the data migration source primary storage 3 from which data is being migrated, the following information is transferred from the HSM interface 10 to the data migration apparatus 1.

Processing content and
Object ID to be processed

The data migration apparatus 1 once stores the information, transferred from the HSM interface 10, in the file system event management unit 25 (step S200).

If the processing content is one of the following types of processing (update processing) for a file or a directory Creation
Deletion
File attribute change
Data update
File or directory movement (pathname change)

the file system event management unit 25 acquires the pathname from the data migration source primary storage 3 with the object ID as the request key and establishes an association between Processing content
Pathname
Object ID.

After that, the file system event management unit 25 sends the association to the data migration processing control unit 21 (step S201).

On the other hand, if the requested processing is not the processing (update processing) described above, the file system event management unit 25 discards the information received from the HSM interface 10.

When the processing is file movement processing, the file system event management unit 25 acquires the following two types of information.

Pathname of movement source (before change)
Pathname of movement destination (after change)

When the data migration processing being executed is terminated, the data migration processing control unit 21 references the information, stored in the migration file management unit 24, to check if there is a file or directory having the same object ID as the object ID described above (step S202).

If it is found as a result of checking in step S202 that there is a file or a directory having the same object ID (YES in step S202), the data migration processing control unit 21 checks if the migration completion flag is on for the file or the directory (step S203).

If the migration completion flag is on (YES in step S203), the data migration processing control unit 21 turns off the migration completion flag in step S204, that is, sets up status to indicate that the migration is not yet completed. If the processing content is file attribute change processing, the data migration processing control unit 21 acquires the attribute information on the requested file from the HSM interface 10, reflects the attribute information on the data stored in the migration destination HSM execution environment and, after that, turns on the migration completion flag corresponding to the file.

If the processing content is update processing of data, the data migration processing control unit 21 turns off the migration completion flag of the requested file, which is stored in the migration file management unit 24, deletes the data stored in the migration destination HSM execution environment and, after that, turns on the migration completion flag.

If the processing content is deletion processing, the data migration processing control unit 21 deletes data of the requested file or directory stored in the migration destination HSM execution environment and, after that, deletes the information on the requested file or directory stored in the migration file management unit 24.

If the processing content is file or directory movement processing, the data migration processing control unit 21 moves the file or directory, stored in the movement destination HSM execution environment, to the location corresponding to the same pathname as that of the movement destination (changed destination) of the movement processing and, after that, turns on the migration completion flag. The processing described above is performed in step S204.

If the migration completion flag is not on (NO in step S203) and if the processing content is file movement processing or directory movement processing, the data migration processing control unit 21 changes the pathname in the information on the requested file or directory, which is stored in the migration file management unit 24, in step S205. If the processing content is deletion processing, the data migration processing control unit 21 deletes the information on the requested file or directory which is stored in the migration file management unit 24. If the processing content is file attribute change processing or data update processing, the data migration processing control unit 21 performs no processing. The processing described above is performed in step S205.

If the information stored in the migration file management unit 24 does not include information that matches the object ID (NO in step S202), the data migration processing control unit 21 registers the pathname and the object ID of the specified file or directory, which are included in the information transferred from the file system event management unit 25, as well as the flag indicating that the migration is not yet completed, in the migration file management unit 24 (step S206). In step S202, the migration file management unit 24 does not include information that matches the object ID, for example, when a file is created in the migration source. To avoid an inconsistent condition, in which a file or directory to be migrated is treated as a file or directory not to be migrated, when a file is accessed via a standard file system call during the migration processing, the system may be configured in one of the following two ways. In one way, when a data access source other than the data migration apparatus 1 accesses the migration destination via a standard file system call, the system transfers, not all information (processing content, object ID of requested file or directory), but only the information on the file or directory to be migrated, to the data migration apparatus 1 in response to the access request. In the other way, means is provided, for example, in the data migration apparatus 1 for determining if the information transferred to the data migration apparatus 1 (processing content, and processing target object ID) is information on the file or directory to be migrated.

The operation of the procedures shown in FIG. 3 and FIG. 4 performed by the data migration apparatus 1 is terminated when an instruction to terminate data migration is received from the system manager via the management interface 20. In addition, if a standard file system call is issued from a data access source other than the data migration apparatus 1 to a data area, from which data is migrated, after the data migration apparatus 1 issues a migration termination notification during the execution of the procedure in FIG. 3, the processing according to the procedure in FIG. 4 is also performed.

As described above, combining the data migration operation according to the procedure in FIG. 3 with the operation on a standard file system call from a data access source other than the data migration apparatus 1 executed according to the procedure shown in FIG. 4 allows the data migration apparatus 1 to perform data migration processing while accepting a data access request from a data access source other than the data migration apparatus 1 even during data migration.

In some cases, a large number of system calls for creating, deleting, or updating files or directories are issued from a data access source other than the data migration apparatus 1 to a data area, from which data is migrated, via a standard file system call and, as a result, the data migration apparatus 1 must perform data migration processing for a long time. In this case, a person responsible for the data migration, for example, the system manager, must stop the processing of a data access service, requested by a data access source other than the data migration apparatus 1, to complete all the migration processing.

The data migration apparatus having the function of the present invention, if used in data migration in two different HSM execution environments, allows data to be migrated to the migration destination while maintaining the data layout based on the operation policy in the migration source HSM execution environment with no need for the primary storage in the migration destination to have the amount of storage equal to the sum of the storage usage of both the primary storage and the secondary storage in the migration source.

The configuration described above eliminates the need for an extensive change in the HSM policy that would otherwise be involved in data migration, simplifies the migration work, and eliminates the need for an extra storage amount to be reserved in the primary storage in the migration destination, thus significantly reducing the device operation cost.

Although data migration between HSM execution environments is described in the example above, the present invention is not limited to this configuration but may also be advantageously applicable to the migration of data, managed by the HSM function, to another storage device not including therein the HSM function as a component. That is, the present invention is applicable to any system where data is migrated to a migration destination while keeping the data layout format in a migration source where files are stored in distributed manner and laid out in two different storage means: one is storage means storing a file that contains file data storage location information (pointer information) and the other is storage means storing data pointed to by the pointer information.

While the present invention has been described with reference to the example above, it is to be understood that the present invention is not limited to the configuration of the example above and that modifications and changes that may be made by those skilled in the art within the scope of the present invention are included.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A data migration apparatus that relocates data from a migration source to a migration destination, said migration source including a data layout mode in which a predetermined file to be migrated with a predefined format at least including pointer information on data and data pointed to by the pointer information in the predetermined file are stored in a distributed manner in storage means in said migration source, said data migration apparatus comprising a processor executing:
   a unit that checks whether a file to be migrated is the predetermined file and, if the file is the predetermined file, reads data pointed to by the pointer information in said predetermined file from the storage means in said migration source, and writes the data in associated storage means in the migration destination; and
   a unit that writes another predetermined file in said storage means in the migration destination, in a mode corresponding to said data layout mode in said migration source, in which the another predetermined file and the data in the migration destination are stored in a distributed manner, said another predetermined file at least including pointer information pointing to the data written in the associated storage means in the migration destination, said another predetermined file conforming to a predefined format in the migration destination.

2. The data migration apparatus according to claim 1, wherein said migration source system includes first storage and second storage wherein said first storage includes an ordinary file as well as the predetermined file and said second storage stores the data pointed to by the pointer information stored in the predetermined file, and said migration destination system includes third and fourth storage, said data migration apparatus further comprising said processor further executing:
   a unit that checks if a file to be migrated from said first storage in the migration source is the predetermined file;
   a unit that, if the file is determined as the predetermined file, reads the data, pointed to by the pointer information in the predetermined file, from said second storage in the migration source and writes the data into said third storage in the migration destination; and
   a unit that creates said another predetermined file, conforming to a format predefined in the migration destination, in said fourth storage in the migration destination and sets the pointer information in the another predetermined file in said fourth storage in the migration destination in such a way that the pointer information points to the data written in said third storage in the migration destination.

3. The data migration apparatus according to claim 1, wherein said data migration apparatus migrates data from a migration source HSM (Hierarchical Storage Management) execution environment to a migration destination HSM execution environment, said data migration apparatus further comprising said processor executing:
   a unit that checks if a file to be migrated is a stub file based on a data layout in primary storage and secondary storage in the migration source;
   a unit that converts the stub file to be migrated to a stub file, which conforms to the migration destination, according to a stub file format and a secondary storage data layout rule used in the migration destination HSM execution environment;

a unit that reads data of the secondary storage in the migration source from an address held in the stub file in the migration source, stores the data in the secondary storage in the migration destination and, at the same time, stores the converted stub file in primary storage in the migration destination; and a unit that migrates an ordinary file other than the stub file from the primary storage in the migration source to the primary storage in the migration destination.

4. The data migration apparatus according to claim 1, wherein said data migration apparatus migrates data from a migration source HSM (Hierarchical Storage Management) execution environment to a migration destination HSM execution environment, said data migration apparatus further comprising said processor further executing:

a unit that distinguishes between a stub file and an ordinary file via an extended file system function provided for implementing HSM in storages in the migration source and the migration destination;

a unit that reads data from secondary storage in the migration source based on a data storage address in secondary storage in the migration source if a file to be migrated is a stub file, said data storage address being stored in the stub file in primary storage in the migration source;

a unit that writes data, read from the secondary storage in the migration source, into secondary storage in the migration destination according to a data storage rule for storing data into the secondary storage in the migration destination;

a unit that reads attribute information on the stub file stored in the primary storage in the migration source and creates a stub file, which has the same name as the stub file in the migration source, in primary storage in the migration destination; and a unit that attaches address information on the data, stored in the secondary storage in the migration destination, and the attribute information, acquired from the primary storage in the data migration source, to the created file according to a generation format of the stub file in the migration destination to complete the migration of data of the stub file that is migrated.

5. The data migration apparatus according to claim 4, further comprising said processor further executing a unit that, responsive to a file operation request issued from a data access source other than said data migration apparatus to the primary storage in the migration source during the data migration, performs a file operation on the data stored in the migration destination if the data, for which the file operation is performed, is managed as data to be migrated and if the migration is already completed.

6. A data migration system comprising:
a data migration apparatus, as set forth in claim 3;
a second processor executing a migration source HSM (Hierarchical Storage Management) execution environment that comprises migration source primary storage and migration source secondary storage; and
a third processor executing a migration destination HSM execution environment that comprises migration destination primary storage and migration destination secondary storage,
said data migration apparatus being connected to the migration source and migration destination HSM execution environments via a network.

7. The data migration system according to claim 6, wherein said migration source HSM execution environment further comprises a data migration source policy management device that controls relocation of data in said primary storage and secondary storage based on a predefined rule, said migration destination HSM execution environment further comprises a data migration destination policy management device that controls relocation of data in said primary storage and secondary storage based on a predefined rule, wherein said migration source primary storage and said migration destination primary storage each comprise a file system and an HSM interface and data stored in the file system is accessed externally via said HSM interface, wherein said data migration apparatus comprises a management interface, a data migration processing control unit, an HSM processing information management unit, a migration processing information management unit, a migration file management unit, and a file system event management unit, wherein:

said management interface includes a function to notify pre-set information, which is necessary for data migration, to said migration processing information management unit and to acquire information on execution status of the data migration processing from said data migration processing control unit and means for notifying a migration processing start instruction to said data migration processing control unit, said HSM processing information management unit stores a command set for performing extended file system function processing via said HSM interface in the HSM execution environment, a generation format of a stub file, and a data relocation rule, used by each of said policy management devices, for relocating data in the secondary storage, said migration processing information management unit stores information on the storages used in the migration, information on a data area, from which data is to be migrated, in the primary storage in the migration source, information on a data storage area in the storage in the migration destination, and device information on said policy management devices, all said information being set via a management interface, said migration file management unit stores pathnames of all files and directories included in the data area, from which data is to be migrated, that are set via said management interface, object IDs that identify the files and the directories in the file system, and flag information indicating whether or not the data migration of the files and directories is completed, said file system event management unit includes a function to acquire, via said HSM interface, processing event information generated when processing is performed by a data access source via a specific standard file system call and to transfer the processing event information to said data migration processing control unit, and said data migration processing control unit includes a function to migrate data from the migration source HSM execution environment to the migration destination HSM execution environment based on the information stored in said HSM processing information management unit, said migration processing information management unit, and said migration file management unit and on the event information notified from said file system event management unit and a function to generate information on execution status of the data migration processing.

8. The data migration system according to claim 7, wherein said file system comprises:
  a unit that hides a data storage position from a data access source by means of a stub file provided for implementing HSM; and
  an extended file system function that is not supported by a standard file system call and that is executed via said HSM interface,
  said extended file system function including
  a function to create, read, update, and delete the stub file; and
  a function to read and update attribute information on the stub file.

9. The data migration system according to claim 8, wherein said file system further comprises, as said extended function, at least one of:
  a function to read and update a file;
  a function to create, read, update, and delete file data without changing file attribute information; and
  a function to notify that a processing event occurs when processing is performed by a data access source via a specific standard file system call.

10. The data migration system according to claim 7, wherein:
  said data migration processing control unit receives a data migration processing notification from said management interface when data is migrated,
  said data migration processing control unit acquires information on the primary storage in the migration source from said migration processing information management unit,
  said data migration processing control unit uses the command set, registered in said HSM processing information management unit for accessing the HSM interface of the primary storage in the migration source, to acquire the pathnames of files and directories included in an area, from which data is to be migrated, and the object IDs associated with the files and directories from the primary storage in the migration source and stores the acquired pathnames and object IDs into said migration file management unit,
  said data migration processing control unit checks information on the primary storage and secondary storage in the migration source and the primary storage and secondary storage in the migration destination, stored in said migration processing information management unit, to determine a migration source storage device, a migration destination storage device, and a data storage destination,
  said data migration processing control unit accesses an object, either a file or a directory, stored in the primary storage in the migration source to check if the accessed object is a file or a directory, said file or directory being registered in said migration file management unit with the migration completion flag thereof not turned on, and
  if the accessed object is a directory, said data migration processing control unit creates a directory, with the same name as that of a corresponding directory in the migration source, in the primary storage in the migration destination and turns on a migration completion flag in information on the directory managed as a directory to be migrated, and
  if the accessed object is a file, said data migration processing control unit checks if the accessed file is a stub file and, if the file is a stub file, reads data from the secondary storage in the migration source based on a data storage address in the secondary storage in the migration source stored in the stub file stored in the primary storage in the migration source, writes the data, read from the secondary storage in the migration source, into the secondary storage in the migration destination according to a data storage rule for writing data into the secondary storage in the migration destination, reads attribute information on the stub file stored in the primary storage in the migration source, and creates a stub file, with the same name as that of the stub file in the migration source, in the primary storage in the migration destination,
  said data migration processing control unit supplies address information on the data stored in the secondary storage in the migration destination, as well as the attribute information acquired from the primary storage in the migration source, to the created stub file according to a stub file generation format in the primary storage in the migration destination to complete the data migration, and turns on a migration completion flag in the information on the file registered in said migration file management unit,
  if the file to be migrated is an ordinary file, said data migration processing control unit reads data and attribute information on the file stored in the primary storage in the migration source, creates a file, with a same name as that of the file in the primary storage in the migration source, in the primary storage in the migration destination, supplies the attribute information, acquired from the primary storage in the migration source, to the created file to complete the data migration, and turns on a migration completion flag in the information on the file registered in said migration file management unit, and
  the migration processing is terminated if the migration completion flag is turned on for all files and directories registered in said migration file management unit.

11. The data migration system according to claim 7, wherein
  if another data access source other than said data migration apparatus requests processing for a data area, from which data is to be migrated, in the primary storage in the migration source via a standard file system call, the primary storage in the migration source transfers information, including a processing content and an object ID of a requested object, to said data migration apparatus,
  said data migration apparatus once stores the transferred information into said file system event management unit,
  said file system event management unit acquires a pathname from the primary storage in the migration source with the object ID as a request key if the processing is update processing,
  said data migration processing control unit checks if there is a file or directory to be migrated, which has the same object ID as said object ID, when data migration processing being executed is terminated and,
  if there is a file or directory with the same object ID as said object ID, checks if the migration completion flag is on, and
    if the migration completion flag in the migration file management unit is on, said data migration processing control unit sets up status to indicate that the migration is not yet completed and, if the processing content is file attribute change processing, said data migration processing control unit reflects attribute information about the requested file, which is stored and managed as a file to be migrated, on the migration destination and, after that, turns on the migration completion flag,
    if the processing content is data update processing, said data migration processing control unit turns off the migration completion flag of the requested file, which is registered in the migration file management unit, deletes data stored in the migration destination HSM execution environment and, after that, turns on the migration completion flag, if the processing content is deletion processing, said data migration processing control unit deletes data of a requested file or directory, which is stored in the migration destination HSM execution environment and, after that, deletes information on the requested file or directory which is stored in said migration file management unit, if the processing content is file or directory movement processing, said data migration processing control unit moves a file or directory, stored in the migration destination HSM execution environment, to a location in the same pathname as a movement destination pathname specified in the movement processing and, after that, turns on the migration completion flag, and if the migration completion flag is not on and if the processing content is file or directory movement processing, said data migration processing control unit changes a pathname in the information on the requested directory or file which is registered in said migration file management unit, if the processing content is deletion processing, said data migration processing control unit deletes information on the requested file or directory which is registered in said migration file management unit, and if the processing content is file attribute change processing or data update processing, said data migration processing control unit performs no processing.

12. The data migration system according to claim 11, wherein, if there is no information, which has an object ID matching said object ID, in the information stored in said migration file management unit, said data migration processing control unit registers the pathname and the object ID, included in the information transferred from said file system event management unit, as well as a flag indicating that the migration is not yet completed, in said migration file management unit.

13. A data migration method executed by a processor that relocates data from a migration source to a migration destination, said migration source including a data layout mode in which a predetermined file with a predefined format at least including pointer information on data and data pointed to by the pointer information in the predetermined file are stored in distributed manner in storage means in said migration source, said method comprising:

checking, as executed by said processor, if a file to be migrated is the predetermined file and, if the file is the predetermined file, reading data pointed to by the pointer information in said predetermined file from the storage means in said migration source, and writing the data in associated storage means in the migration destination; and writing another predetermined file in storage means in the migration destination in a mode corresponding to said data layout mode in said migration source, in which the another predetermined file and the data in the migration destination are stored in distributed manner, said another predetermined file at least including pointer information pointing to the data written in the associated storage means in the migration destination, said another predetermined file conforming to a predefined format in the migration destination.

14. The method according to claim 13, for use by a data migration apparatus, which migrates data from a migration source HSM (Hierarchical Storage Management) execution environment to a migration destination HSM execution environment, said method comprising:

checking if a file to be migrated is a stub file based on a data layout in primary storage and secondary storage in the migration source;

converting the stub file to be migrated to a stub file, which conforms to the migration destination, according to a stub file format and a secondary storage data layout rule used in the migration destination HSM execution environment;

reading data of the secondary storage in the migration source from an address held in the stub file in the migration source, storing the data in the secondary storage in the migration destination and, at the same time, storing the converted stub file in primary storage in the migration destination; and migrating an ordinary file from the primary storage in the migration source to the primary storage in the migration destination.

15. The method according to claim 14, wherein, in response to a file operation request from a data access source other than said data migration apparatus to the primary storage in the migration source, the migrated data is corrected.

16. The method according to claim 13, for use by a data migration apparatus, which migrates data from a migration source HSM (Hierarchical Storage Management) execution environment to a migration destination HSM execution environment, for migrating data from the migration source to the migration destination, said method comprising:

distinguishing between a stub file and an ordinary file via an extended file system function provided for implementing HSM in storages in the migration source and the migration destination;

reading data from secondary storage in the migration source based on a data storage address in secondary storage in the migration source if a file to be migrated is a stub file, said data storage address being stored in the stub file in primary storage in the migration source;

writing data, read from the secondary storage in the migration source, into secondary storage in the migration destination according to a data storage rule for storing data into the secondary storage in the migration destination;

reading attribute information on the stub file stored in the primary storage in the migration source and creating a stub file, which has the same name as the stub file in the migration source, in primary storage in the migration destination; and attaching address information on the data, stored in the secondary storage in the migration destination, and the attribute information, acquired from the primary storage in the migration source, to the created file according to a generation format of the stub file in the migration destination to complete the migration of data of the stub file that is migrated.

17. A computer-readable storage medium encoded with a program of instructions which, when executed in a computer, relocates data from a migration source to a migration destination, said migration source including a data layout mode in which a predetermined file with a predefined format at least including pointer information on data and data pointed to by the pointer information in the predetermined file are stored in distributed manner in storage means in said migration source, said program causing said computer to execute the processing of:

checking if a file to be migrated is the predetermined file and, if the file is the predetermined file, reading data pointed to by the pointer information in said predetermined file from the storage means in said migration source, and writing the data in associated storage means in the migration destination; and writing another predetermined file in storage means in the migration destination in a mode corresponding to said data layout mode in said migration source, in which the another predetermined file and the data in the migration destination are stored in distributed manner, said another predetermined file at least including pointer information pointing to the data written in the associated storage means in the migration destination, said another predetermined file conforming to a predefined format in the migration destination.

18. The computer-readable storage medium encoded with the program of instructions according to claim 17, said instructions being executed in a computer constituting a data migration apparatus, which migrates data from a migration source HSM (Hierarchical Storage Management) execution environment to a migration destination HSM execution environment, for migrating data from the migration source to the migration destination, said program causing said computer to execute the processing of:

checking if a file to be migrated is a stub file based on a data layout in primary storage and secondary storage in the migration source;

converting the stub file to be migrated to a stub file, which conforms to the migration destination, according to a stub file format and a secondary storage data layout rule used in the migration destination HSM execution environment;

reading data of the secondary storage in the migration source from an address held in the stub file in the migration source, storing the data in the secondary storage in the migration destination and, at the same time, storing the converted stub file in primary storage in the migration destination; and migrating an ordinary file other than the stub file from the primary storage in the migration source to the primary storage in the migration destination.

19. The computer-readable storage medium encoded with the program of instructions according to claim 17, said instructions being executed in a computer constituting a data migration apparatus, which migrates data from a migration source HSM (Hierarchical Storage Management) execution environment to a migration destination HSM execution environment, for migrating data from the migration source to the migration destination, said program causing said computer to execute the processing of:

distinguishing between a stub file and an ordinary file via an extended file system function provided for implementing HSM in storages in the migration source and the migration destination;

reading data from secondary storage in the migration source based on a data storage address in secondary storage in the migration source, if a file to be migrated is a stub file, said data storage address being stored in the stub file in primary storage in the migration source;

writing data, read from the secondary storage in the migration source, into secondary storage in the migration destination according to a data storage rule for storing data into the secondary storage in the migration destination;

reading attribute information on the stub file stored in the primary storage in the migration source and creating a stub file, which has the same name as the stub file in the migration source, in primary storage in the migration destination; and attaching address information on the data, stored in the secondary storage in the migration destination, and the attribute information, acquired from the primary storage in the migration source, to the created file according to a generation format of the stub file in the primary storage in the migration destination to complete the migration of data of the stub file that is migrated.

20. The computer-readable storage medium encoded with the program of instructions according to claim 19, said instructions further causing said computer to perform a file operation for data stored in the migration destination if a file operation request is generated from another data access source other than said data migration apparatus to the primary storage in the migration source during data migration and if data for which the file operation is to be performed is managed as a data migration object and is already migrated.

* * * * *